United States Patent
Lee et al.

(10) Patent No.: US 12,162,075 B2
(45) Date of Patent: Dec. 10, 2024

(54) DOOR HINGE AND METHOD OF MANUFACTURING SAME

(71) Applicants: HYUNDAI MOTOR COMPANY, Seoul (KR); KIA CORPORATION, Seoul (KR)

(72) Inventors: Jin Hyeon Lee, Busan (KR); Yeong Cheol Jo, Suwon-si (KR); Hyung Seok Kwak, Gunpo-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 743 days.

(21) Appl. No.: 17/370,439

(22) Filed: Jul. 8, 2021

(65) Prior Publication Data
US 2021/0332622 A1   Oct. 28, 2021

Related U.S. Application Data

(62) Division of application No. 16/520,125, filed on Jul. 23, 2019, now Pat. No. 11,085,214.

(30) Foreign Application Priority Data

Dec. 10, 2018   (KR) .......................... 10-2018-0158660

(51) Int. Cl.
*B22F 3/22*   (2006.01)
*B22F 5/00*   (2006.01)
(Continued)

(52) U.S. Cl.
CPC ................ *B22F 3/225* (2013.01); *B22F 5/00* (2013.01); *B22F 7/06* (2013.01); *B22F 10/14* (2021.01);
(Continued)

(58) Field of Classification Search
CPC ..... E05D 2005/104; E05D 3/02; B22F 3/225; B29C 45/0017; B33Y 10/00
See application file for complete search history.

(56) References Cited

U.S. PATENT DOCUMENTS 2,734,223 A   2/1956   Park
2,817,871 A   12/1957   Perry
(Continued)

FOREIGN PATENT DOCUMENTS

CN   105705716 A   6/2016
CN   106761093 A   5/2017
(Continued)

OTHER PUBLICATIONS

DE8323242U1 translation (Year: 1985).*
1 Office Action cited in corresponding Korean application No. 10-2018-0158660; Mar. 20, 2023; 8 pp.

*Primary Examiner* — Michael W Hotchkiss
(74) *Attorney, Agent, or Firm* — Lempia Summerfield Katz LLC

(57) ABSTRACT

A method of manufacturing a door hinge, which can improve productivity by applying both metal injection molding and additive manufacturing is disclosed. The method includes: preparing a first mixture of a first metal powder and a first binder, and a second mixture of a second metal powder and a second binder; molding the first mixture into a first body including a first connection member having a first pinhole; molding the first mixture into a second body including a second connection member having a second pinhole to communicate with the first pinhole; arranging the first body and the second body to align the first pinhole and the second pinhole along an axis to form a cavity; forming a pin member with the second mixture in the cavity by (Continued)

adding up droplets of the second mixture in the cavity; and sintering the first body, the second body, and the pin member.

11 Claims, 4 Drawing Sheets

(51) Int. Cl.
| | |
|---|---|
| *B22F 7/06* | (2006.01) |
| *B22F 10/14* | (2021.01) |
| *B22F 10/32* | (2021.01) |
| *B22F 12/86* | (2021.01) |
| *B33Y 10/00* | (2015.01) |
| *B33Y 80/00* | (2015.01) |
| *E05D 3/02* | (2006.01) |
| *E05D 5/10* | (2006.01) |
| *E05D 5/12* | (2006.01) |
| *E05D 5/14* | (2006.01) |
| *E05D 9/00* | (2006.01) |

(52) U.S. Cl.
CPC .............. *B22F 10/32* (2021.01); *B33Y 10/00* (2014.12); *B33Y 80/00* (2014.12); *E05D 3/02* (2013.01); *E05D 5/10* (2013.01); *E05D 5/12* (2013.01); *E05D 5/14* (2013.01); *E05D 9/00* (2013.01); *B22F 12/86* (2021.01); *E05D 2005/104* (2013.01); *E05Y 2800/45* (2013.01); *E05Y 2800/46* (2013.01); *E05Y 2800/674* (2013.01); *E05Y 2900/531* (2013.01)

(56) References Cited

U.S. PATENT DOCUMENTS

| | | | |
|---|---|---|---|
| 2,997,734 | A | 8/1961 | Dyer |
| 3,013,297 | A | 12/1961 | Perry |
| 3,135,013 | A | 6/1964 | Parsons |
| 3,188,686 | A | 6/1965 | Orcutt |
| 3,621,512 | A | 11/1971 | Johnson |
| 4,175,315 | A | 11/1979 | Hayes, Jr. et al. |
| 5,956,809 | A | 9/1999 | Hodgson |
| 6,216,316 | B1 | 4/2001 | Errichiello |
| 6,804,862 | B2 | 10/2004 | Miller |
| 7,603,746 | B1 | 10/2009 | von Resch et al. |
| 8,486,204 | B2 | 7/2013 | Lu et al. |
| 10,487,552 | B2 | 11/2019 | Prison |
| 10,787,846 | B2 * | 9/2020 | Notarnicola ............ E21B 47/10 |
| 10,820,641 | B2 | 11/2020 | Pandolfino |
| 11,408,215 | B2 * | 8/2022 | Lindberg ............ B29C 45/1628 |
| 11,408,216 | B2 * | 8/2022 | Gunner .................. B33Y 80/00 |
| 2004/0107541 | A1 | 6/2004 | Miller |
| 2006/0249358 | A1 | 11/2006 | Hartman et al. |
| 2008/0134466 | A1 * | 6/2008 | Massengill ......... B29C 45/0017 |
| | | | 16/386 |
| 2012/0120561 | A1 | 5/2012 | Lu et al. |
| 2016/0208534 | A1 | 7/2016 | Prison |
| 2017/0096847 | A1 * | 4/2017 | Liu ....................... B33Y 80/00 |
| 2018/0292863 | A1 | 10/2018 | Escamilla |
| 2019/0292821 | A1 * | 9/2019 | Gunner .................. E05D 5/12 |
| 2020/0018102 | A1 * | 1/2020 | Lindberg ............... E05D 3/145 |

FOREIGN PATENT DOCUMENTS

| | | | | |
|---|---|---|---|---|
| DE | 8323242 | U1 * | 5/1985 | ............ B22D 19/12 |
| JP | 2001173306 | A | 6/2001 | |
| KR | 10-2013-0084774 | A | 7/2013 | |

* cited by examiner

DOOR HINGE AND METHOD OF MANUFACTURING SAME

CROSS-REFERENCE TO RELATED APPLICATIONS

This application is a divisional application of non-provisional U.S. patent application Ser. No. 16/520,125, filed on Jul. 23, 2019, which claims priority to and the benefit of Korean Patent Application No. 10-2018-0158660, filed on Dec. 10, 2018, the entire contents of which are incorporated herein by reference.

FIELD

The present disclosure relates to a door hinge and a method of manufacturing the same.

BACKGROUND

The statements in this section merely provide background information related to the present disclosure and may not constitute prior art.

Recently, due to the addition of specifications of convenience, or the like, the load applied to chassis components is inevitably increased due to an increase of the weight of a vehicle. Paradoxically, in order to prevent global warming, the world is demanding to improve the fuel efficiency of automobiles to reduce greenhouse gas emissions, and therefore the need to lighten the weight of automobile parts has been greatly emphasized.

A door hinge is a part that enables the door to rotate by coupling a vehicle body-side bracket and a body-side bracket using a fixing pin. In case of medium and large vehicles, it is necessary to secure high strength materials and rigidity due to an increase in the weight of the door.

It should be understood that the foregoing description of the background art is merely for the purpose of promoting an understanding of the background of the present disclosure, and is not to be construed as admitting that the present disclosure corresponds to the prior art known to those skilled in the art.

SUMMARY

One aspect of the present disclosure provides a door hinge and a method of manufacturing the same, which can improve productivity by applying both metal injection molding and additive manufacturing.

In accordance with an aspect of the present disclosure, a door hinge may include: a first body configured to include at least one first connection member in which a first pinhole is formed; a second body configured to include at least one second connection member in which a second pinhole communicating with the first pinhole is formed; and a pin member configured to be added and filled in a cavity formed by communicating the first pinhole of the first body and the second pinhole of the second body with each other so that the first body and the second body are foldably connected to each other.

The first body and the second body may be formed in a metal injection molding method, and the pin member may be formed in an additive manufacturing method.

The first body, the second body, and the pin member may be formed by molding a mixture of a Fe—Ni—C-based metal powder and a binder, and then sintering the molded mixture.

The first body, the second body, and the pin member may have a tensile strength of 500 MPa or more and an elongation of 15% or more after sintering.

The pinhole disposed at the lowermost end, which is either the first pinhole or the second pinhole, may be closed in a lower end portion thereof.

The pinhole disposed at the lowermost end, which is either the first pinhole or the second pinhole, may form an enlarged region whose lower end portion has a larger volume than other regions thereof.

In accordance with another aspect of the present disclosure, a method of manufacturing a door hinge may include: a material preparing step of preparing a mixture of a metal powder and a binder; a body molding step of molding a first body including at least one first connection member in which a first pinhole is formed and a second body including at least one second connection member in which a second pinhole communicating with the first pinhole is formed; a coupling step of coupling the first body and the second body to form a cavity in which the first pinhole and the second pinhole communicate with each other; a pin member molding step of molding a pin member by adding the mixture in the cavity formed by communicating the first pinhole and the second pinhole by the coupling of the first body and the second body and filling the cavity with the mixture; and a sintering step of sintering the first body, the second body, and the pin member.

The body molding step may include molding the first body and the second body by molding the mixture in a metal injection molding method, and the pin member molding step may include molding the mixture in an additive manufacturing method.

The body molding step may include maintaining a temperature of a mold for molding the first body and the second body at 20 to 40° C., and the pin member molding step may include cooling the mixture while adding the mixture on the cavity of which an atmosphere temperature is formed at a temperature corresponding to the temperature of the mold in a state in which the temperature of the mixture filled in the cavity is maintained at 90 to 100° C.

The pin member molding step may include cooling the mixture, which is added and filled in the cavity, while reaction with oxygen is blocked by injection of an inert gas.

The method of manufacturing a door hinge may further include: at least one of a first degreasing step of removing residues from the first body and the second body after the body molding step; and a second degreasing step of removing residues from the first body, the second body, and the pin member after the pin member molding step.

According to embodiments of the present disclosure, since the door hinge can be manufactured by applying both the metal injection molding and the additive manufacturing, it is possible to omit a post-treatment process such as an assembly process and surface processing as in a case of manufacturing the door hinge using a typical precision casting method, whereby the number of processes can be reduced compared to the typical manufacturing process to improve the productivity.

In addition, it is possible to realize a door hinge having a complicated shape using the metal injection molding.

On the other hand, compared with a case where the entire door hinge is manufactured using the additive manufacturing, a pair of bodies having a predetermined shape is manufactured by utilizing metal injection molding, and a pin member is formed by utilizing the additive manufacturing at a main connecting portion, whereby the number of processes can be reduced while maintaining the advantages of each process.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Hereinafter, embodiments of the present disclosure will be described in detail with reference to the accompanying drawings. The present disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. Like numbers refer to like elements throughout and prime notation is used to indicate similar elements in alternate embodiments.

Figure 1:
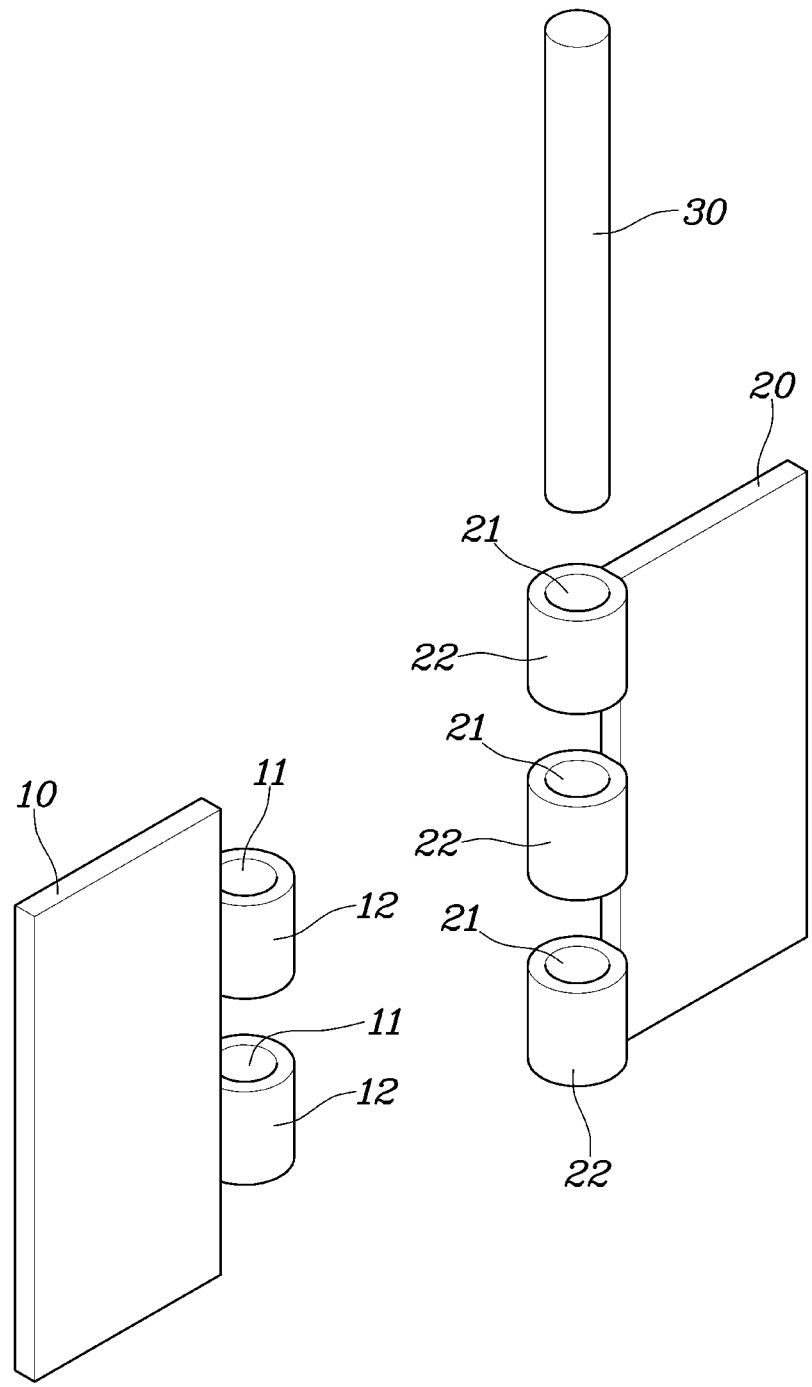
FIG. 1 is a view showing the structure of a general door hinge.

FIG. 1 is a view showing the structure of an implementation of a door hinge. As shown in FIG. 1, the door hinge includes a vehicle body-side bracket 10 fixed to a vehicle body side and a door-side bracket 20 coupled to each other using a fixing pin 30 so that the vehicle body-side bracket 10 and the door-side bracket 20 are foldably or connected to each other. For engagement with the fixing pin 30, the vehicle body-side bracket 10 and the door-side bracket 20 are respectively provided with at least one vehicle body-side connection member 12 in which a vehicle body-side pinhole 11 is formed, and at least one door-side connection member 22 in which a door-side pinhole 21 is formed. Accordingly, while the vehicle body-side pinhole 11 and the door-side pinhole 21 are communicated with each other, the fixing pin is inserted and engaged.

The door hinge illustrated in FIG. 1 is manufactured such that the vehicle body-side bracket 10, the door-side bracket 20, and the fixing pin 30 are respectively molded by precision casting, the fixing pin 30 is assembled to the vehicle body-side bracket 10 and the door-side bracket 20, and then is subjected to a post-treatment process.

Thus, the number of processes increases and the cost of the door hinge increases. In addition, when the plating of each of the vehicle body-side bracket 10, the door-side bracket 20, and the fixing pin is peeled off during the assembling process, quality characteristics may be deteriorated due to occurrence of corrosion at a corresponding portion.

When manufacturing door hinges, 3D printing technology such as additive manufacturing may be used. However, when the entire portion of the door hinge is manufactured using additive manufacturing, it may be difficult to apply the additive manufacturing to mass production due to a lot of space and time to be required.

Figure 2:
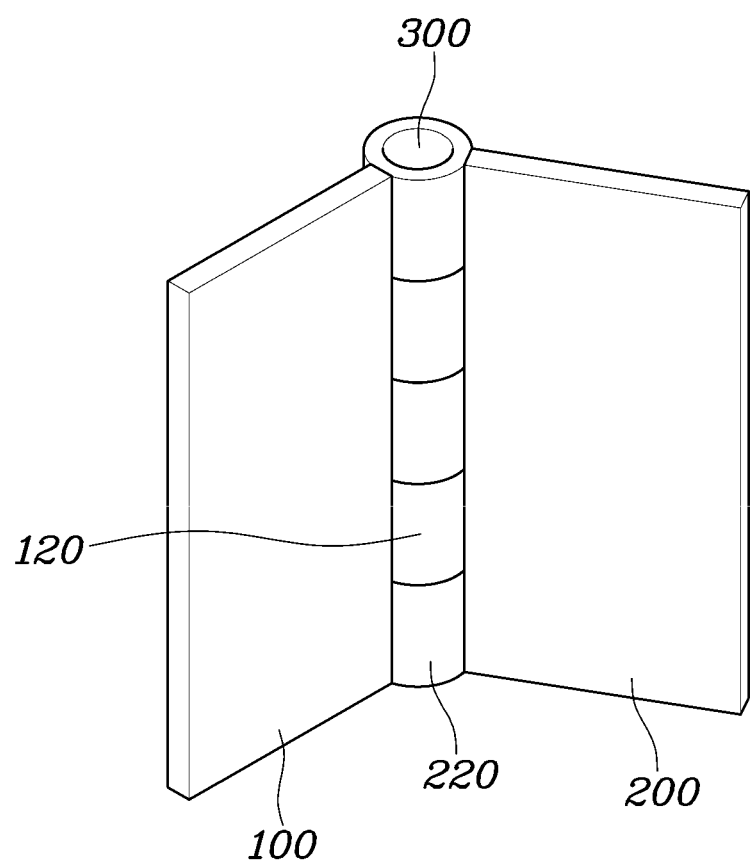
FIG. 2 is a perspective view showing the structure of a door hinge according to an embodiment of the present disclosure.
Figure 3:
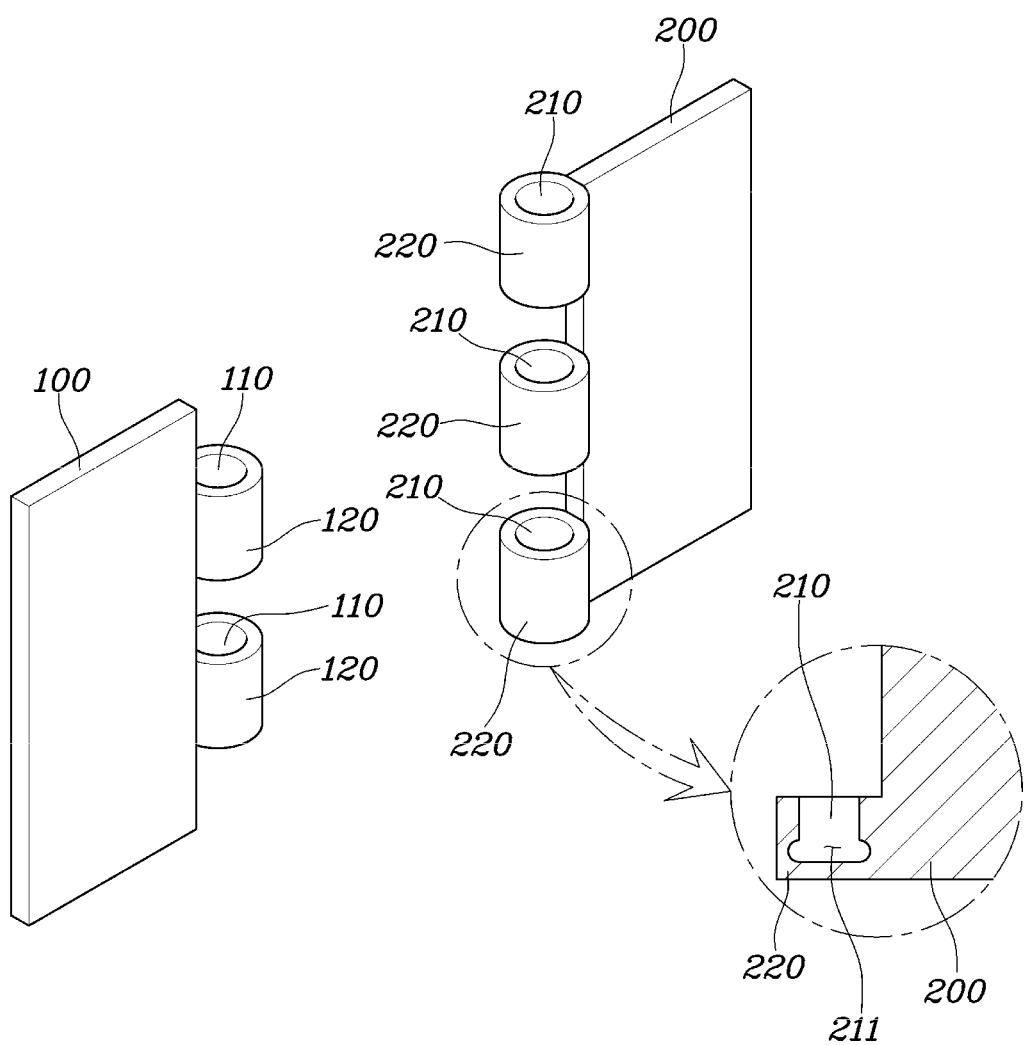
FIG. 3 is an exploded perspective view showing the structure of a door hinge according to an embodiment of the present disclosure.
Figure 4:
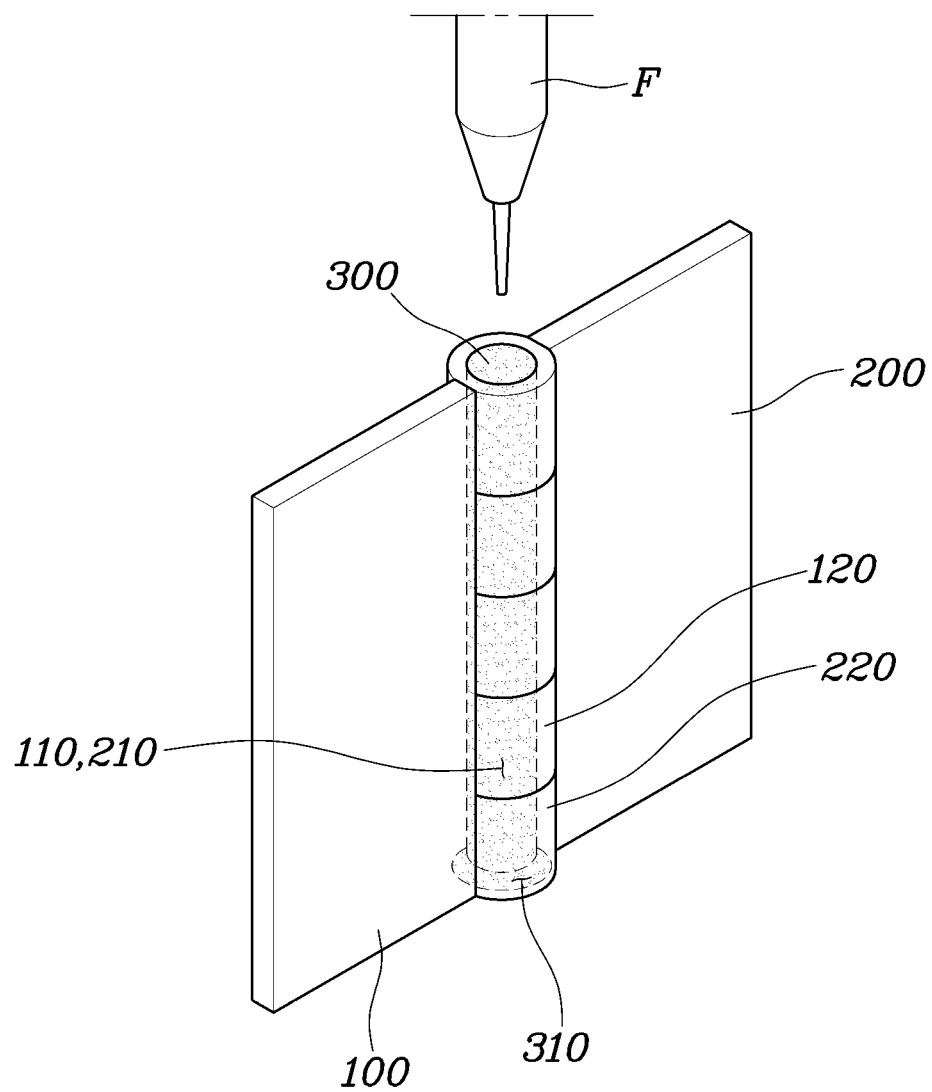
FIG. 4 is a view showing a main process in manufacturing a door hinge according to an embodiment of the present disclosure.

FIG. 2 is a perspective view showing the structure of a door hinge according to an embodiment of the present disclosure, FIG. 3 is an exploded perspective view showing the structure of a door hinge according to an embodiment of the present disclosure, and FIG. 4 is a view showing a main process in manufacturing a door hinge according to an embodiment of the present disclosure.

As shown in the drawing, a door hinge according to an embodiment of the present disclosure includes: a first body 100 configured to include at least one first connection member 120 in which a first pinhole 110 is formed; a second body 200 configured to include at least one second connection member 220 in which a second pinhole 210 communicating with the first pinhole 110 is formed; and a pin member 300 provided in the first pinhole 110 of the first body 100 and the second pinhole 210 of the second body 200 so that the first body 100 and the second body 200 are foldably connected to each other.

In one implementation of manufacturing door hinges, the pin member 300 may be manufactured separately from the first body 100 and the second body 200 and assembled to the first body 100 and the second body 200. In the present embodiment, however, the pin member 300 is formed in a cavity that is formed by the first pinhole 110 of the first body 100 and the second pinhole 210 of the second body 200 communicating with each other.

Thus, in this embodiment, it is preferable that the first body 100 and the second body 200 be molded by metal injection molding (hereinafter, referred to as a MIM method), and the pin member 300 be molded by additive manufacturing (hereinafter, referred to as an AM method) using a binder jet technique.

In this embodiment, the shapes of the first body 100 and the second body 200 are not limited to a specific shape, but may be variously modified in the form of a normal door hinge. However, the first pinhole 110 of the first body 100 and the second pinhole 210 of the second body 200 are aligned along an axis to keep in communication with each other so that the pin member 300 can form cavities 110 and 210 that can be formed by the AM method.

In embodiments, droplets of the material for forming the pin member 300 are added in the cavities 110 and 210. In one embodiment, in order to apply the AM method to form the pin member 300, it is preferable that the lower end portion of the pinhole disposed at the lowermost end, which is either the first pinhole 110 or the second pinhole 210, be closed. Thus, the lower ends of the cavities 110 and 210 formed by the first pinhole 110 and the second pinhole 210 are closed, and a material used for forming the pin member 300 is added and filled in the closed region.

Meanwhile, in a case in which the first and second bodies 100 and 200 and the pin member 300 are sintered, although the first and second bodies 100 and 200 and the pin member 300 are contracted at different contraction ratios according to sintering conditions, it is preferable that the pinhole disposed at the lowermost end, which is either the first pinhole 110 or the second pinhole 210, form an enlarged region 211 whose lower end portion has a larger volume than other regions in order to prevent the pin member 300 from being detached from the cavities 110 and 210 formed by the first pinhole 110 and the second pinhole 210. Thus, an enlarged portion 310 having a larger volume than other portions of the pin member is formed at the lower end of the pin member.

A method of manufacturing the door hinge according to an embodiment of the present disclosure configured as above will be described.

The method of manufacturing the door hinge according to an embodiment of the present disclosure includes: a material preparing step of preparing a mixture of a metal powder and a binder; a body molding step of molding the first body 100 and the second body 200; a coupling step of coupling the first body 100 and the second body 200 to form the cavities 110 and 210 in which the first pinhole 110 and the second pinhole 210 communicate with each other; a pin member molding step of molding the pin member 300 by adding the mixture in the cavities 110 and 210 and filling the cavities 100 and 210 with the mixture; and a sintering step of sintering the first body 100, the second body 200, and the pin member 300.

The material preparing step is a step of preparing a material used for forming the first body 100, the second body 200, and the pin member 300. In this embodiment, a Fe—Ni—C-based metal powder and a binder are mixed to prepare a mixture.

For example, the Fe—Ni—C-based metal powder is a metal powder obtained by adding C to a Fe—Ni-based powder in order to secure mechanical properties, and Fe-2Ni-0.5C may be used.

As the binder, wax or polyoxymethylene may be used.

As the material used for molding the first body 100, the second body 200, and the pin member 300, the Fe—Ni—C-based metal powder of 60 to 65% and the binder of 35 to 40% are mixed in volume % and prepared. In embodiments, the content of the binder is equal to or more than 35% to avoid insufficient fluidity of the mixture that may cause insufficient filling of the mixture at the time of injection occurs. The content of the binder is equal to or smaller than 40% to reduce a degreasing time of the binder and avoid or minimize defects caused by a residual binder in the first body 100, the second body 200, and the pin member 300. The body molding step is a step of molding and preparing the first body 100 including at least one first connection member 120 in which the first pinhole 110 is formed and the second body 200 including at least one second connection member 220 in which the second pinhole 210 communicating with the first pinhole 110 is formed, respectively. Each of the first body 100 and the second body 200 is molded by the MIM method using the mixture prepared in the material preparing step.

At this time, it is important to secure the rigidity when the first connection member 120 of the first body 100 and the second connecting member 220 of the second body 200 are coupled to each other. Thus, it is preferable to secure rigidity of about 7 kgf.

In addition, when the first body 100 and the second body 200 are manufactured by applying the MIM method, it is important to prevent burrs or flashes and weld lines that may occur on the surfaces of the first body 100 and the second body 200 and to prevent injection defects that may occur in the first body 100 and the second body 200.

Factors preventing the occurrence of such defects include injection speed, injection pressure, holding pressure, mold temperature, and the like, and these factors should be set according to various conditions such as the material, shape, and size of a product.

For example, when the injection speed is increased, the filling time is reduced and the injection weight is increased, but burrs and internal defects may occur. When the injection pressure is increased, the filling time is reduced and the injection weight is increased, but a variation for each filling region may occur.

In addition, when the holding pressure is increased, the injection weight is increased and the variation for each filling region is small, but weight control is difficult. When the mold temperature is increased, the fluidity of the mixture to be injected can be improved, but bubbles may be generated on the surface of the product so that the surface quality may be deteriorated.

Accordingly, in this embodiment, it is preferable to maintain the injection speed of 60 to 80 cm$^2$/s, the injection pressure of 50 to 70 MPa, the holding pressure of 30 to 50 MPa, and the mold temperature of 20 to 40° C. as appropriate conditions in the MIM method. By maintaining the above conditions, it is possible to secure sufficient fluidity of the mixture, to remove pores remaining in the interior after injection, and to prevent surface defects.

The coupling step is a step of coupling the first body 100 and the second body 200 to form the cavities 110 and 210 in which the first pinhole 110 and the second pinhole 210 communicate with each other. The cavities 110 and 210 provide a space where the pin member 300 in which the mixture is added and filled is molded.

In the pin member molding step, the pin member is molded in the AM method, using the mixture prepared in the material preparing step.

Specifically, the cavities 110 and 210 in which the first pinhole 110 and the second pinhole 210 communicate with each other formed by coupling the first body 100 and the second body 200 in the coupling step are closed at the lower ends thereof, and a material used for forming the pin member 300 is added and filled in the closed region. In particular, it is preferable that the pinhole disposed at the lowermost end, which is either the first pinhole 110 or the second pinhole 210, form an enlarged region 211 whose lower end portion has a larger volume than other regions, thereby forming the pin member 300 corresponding to the shapes of the cavities 110 and 210 in which the enlarged region 211 is formed. Thus, the cavities 110 and 210 in which the first pinhole 110 and the second pinhole 210 communicate with each other, which are formed by coupling the first body 100 and the second body 200 with each other, may serve as guides for a filling path of an injection means F for adding the mixture for forming the pin member 300.

Meanwhile, in a state in which the temperature of the mixture to be filled in the cavities 110 and 210 is maintained at 90 to 100° C. in the pin member molding step, it is preferable that the mixture be added and cooled while the temperature atmosphere of the cavities 110 and 210 is formed at a temperature corresponding to the mold temperature for molding the first body 100 and the second body 200 in the MIM method.

In particular, when the mixture is injected and added in the cavities 110 and 210 to form the pin member 300, in order to maintain the fluidity while maintaining a constant shape, the temperature of a nozzle portion of the injection means F for filling the cavities 110 and 210 with the mixture is maintained at 90 to 100° C. and the temperature atmosphere of the cavities 110 and 210 is maintained at 20 to 40° C., and preferably at 25 to 35° C. Thus, it is preferable that the mixture which is filled and added at 90 to 100° C. be cooled at a temperature of 20 to 40° C.

Meanwhile, in the pin member molding step, it is preferable that the mixture added and filled in the cavities 110 and 210 be cooled while reaction with oxygen is blocked by injection of an inert gas such as Ar gas.

In this manner, the mixture is added in the cavities 110 and 210 formed on the first body 100 and the second body 200, which are separately molded, and is cooled. Thus, even when the mixture is bonded to the first body 100 and the second body 200 while it is cooled, the bonding force is insufficient, so that it can be expected that the bonded portion will be removed later at the time of rotation of the first body 100 and the second body 200.

In one embodiment, the mixture material for forming the first and second bodies is the same as that for forming the pin member. In another embodiment, the mixture material for forming the first and second bodies are different from that for forming the pin member such that they have different properties, e.g. contraction ration, from each other.

The sintering step is a step of improving the mechanical properties so that the first body 100 and the second body 200 manufactured in the MIM method and the pin member 300 manufactured in the AM method satisfy the physical properties required at the door hinge. The sintering step is carried out by adjusting sintering conditions, for example, a sintering temperature and a sintering time.

In this embodiment, it is preferable that the first body 100, the second body 200, and the pin member 300 be maintained at the sintering temperature of 1350 to 1360° C. for about 1 hour or more to secure mechanical properties, so that the tensile strength after sintering is 500 MPa or more and the elongation is maintained at 15% or more. When the sintering time has elapsed about 1 hour, a sintered body is smoothly formed to secure a desired level of mechanical properties.

In particular, in order to prevent surface decarburization of the first body 100, the second body 200, and the pin member 300 in the sintering step, it is preferable to form the atmosphere inside a sintering furnace as a weak carbonizing atmosphere. For example, the content of carbon inside the sintering furnace is maintained at a level of 0.6% to prevent surface decarburization.

Meanwhile, in the present embodiment, at least one of a first degreasing step of removing residues from the first body 100 and the second body 200 after the body molding step; and a second degreasing step of removing residues from the first body 100, the second body 200, and the pin member 300 after the pin member molding step may be further performed.

Preferably, both the first degreasing step and the second degreasing step are performed, but only the second degreasing step can be performed in order to simplify the number of processes. At this time, the first degreasing step and the second degreasing step are carried out at a temperature of about 110 to 130° C., and a degreasing rate of the binder is 90% or more.

Although the present disclosure has been described with reference to the accompanying drawings and embodiments described above, the present disclosure is not limited thereto but is limited by the following claims. Accordingly, those skilled in the art will appreciate that various modifications and changes may be made thereto without departing from the spirit of the following claims.

What is claimed is:

1. A method of manufacturing a door hinge, comprising:
   preparing a first mixture of a first metal powder and a first binder and a second mixture of a second metal powder and a second binder;
   molding the first mixture into a first body including at least one first connection member in which a first pinhole is formed;
   molding the first mixture into a second body including at least one second connection member in which a second pinhole configured to communicate with the first pinhole is formed;
   arranging the first body and the second body to align the first pinhole and the second pinhole along an axis such that the first pinhole and the second pinhole form a cavity;
   forming a pin member with the second mixture in the cavity by adding up droplets of the second mixture in the cavity; and
   sintering the first body, the second body, and the pin member.

2. The method of manufacturing a door hinge of claim 1, wherein the first body and the second body are molded in a metal injection molding method, and
   wherein the pin member is formed in an additive manufacturing method.

3. The method of manufacturing a door hinge of claim 1, wherein a temperature of a mold for molding the first body and the second body is maintained at 20° C. to 40° C.

4. The method of manufacturing a door hinge of claim 1, wherein forming the pin member comprises cooling the second mixture while adding up the droplets of the second mixture in the cavity of which a temperature is 20° C. to 40° C., whereas a temperature of the second mixture is maintained at 90° C. to 100° C.

5. The method of manufacturing a door hinge of claim 1, wherein the pin member is formed while reaction with oxygen is blocked by injection of an inert gas.

6. The method of manufacturing a door hinge of claim 1, further comprising:
   removing residues of the first mixture from the first body and the second body after molding the first body and the second body.

7. The method of manufacturing a door hinge of claim 1, further comprising:
   removing residues of the first and second mixtures from the first body, the second body, and the pin member after forming the pin member.

8. The method of manufacturing a door hinge of claim 1, wherein the second mixture has a contraction ratio greater than that of the first mixture during sintering.

9. The method of manufacturing a door hinge of claim 1, wherein the first mixture and the second mixture are the same material.

10. The method of manufacturing a door hinge of claim 1, wherein the first body and the second body are molded together in a single mold.

11. The method of manufacturing a door hinge of claim 10, wherein a temperature of the mold for molding the first body and the second body is maintained at 20° C. to 40° C.

* * * * *